Patented Oct. 19, 1943

2,332,311

UNITED STATES PATENT OFFICE 2,332,311

COLORED EMULSIFIED ASPHALT COMPOSITION

Leon Ralph Fadden, New Brighton, N. Y., assignor to Contracting Division A. C. Horn Corporation, Long Island City, N. Y.

No Drawing. Application May 24, 1940, Serial No. 336,931

1 Claim. (Cl. 106—277)

The present invention relates to coloring emulsified asphalt compositions, and it particularly relates to coloring asphalt emulsions for use in flooring, paving and coating compositions, reenforcing compositions, precast products, etc.

Although the present invention has a broad application to compositions including aqueous dispersions of bituminous materials for a wide variety of uses, it will be particularly described in its application to colored emulsified asphalt compositions useful as mastics which have a relatively high compressive strength, but a relatively weak tensile strength.

The invention is specifically directed to such compositions as utilize a steam refined residual asphalt emulsion containing 60 to 64% solids, which asphalt may have a melting point of about 130 to 135° F. and a penetration value of about 40 to 50 on the ball and ring scale and which asphalts are emulsifiable without cutting with a solvent.

It has not been found particularly desirable to use the procedure of the present invention with natural asphalts. Such natural asphalts have a melting point of about 350° F., which is too high for the above purposes, and before they can be used, they must be combined with other materials to reduce the melting point below 212° F.

It has also been found that the invention is most applicable to asphalt emulsions in which a colloidal clay, such as bentonite, is used as an emulsifying agent and in which a filler material is utilized, particularly a sharp or river sand.

The present invention may be regarded as being generally applicable to bituminous materials which may be emulsified to a stable emulsion with the use of colloidal clay, but it is not particularly applicable to metasilicate emulsions and it is not applicable at all to soap emulsions.

It has been found quite difficult to color asphalt emulsions because of the tendency of the black of the asphalt or other bituminous material to destroy or overcome the tinctorial value of the pigment which may be added.

As a result, even though large quantities of pigment were utilized, a rather dirty or muddy color was obtained, and the composition did not have a full development of the desirable mechanical, durability of strength characteristics because of such large amounts of pigment.

It has not been found particularly satisfactory to produce colored emulsified asphalt compositions with albino asphalt emulsions because of the high cost of the albino asphalt and also because of the poor quality of the product obtained and the lowered strength and durability.

It is, therefore, among the objects of the present invention to provide an improved process of coloring emulsified asphalt and similar compositions, and particularly emulsified compositions which may be readily utilized for floorings, pavings, coatings, precast products and similar purposes, and which will have a high development of tinctorial value, although relatively small amounts of pigments are utilized without substantial interference by the tinctorial value of the black in the asphalt or similar material.

Still further objects and advantages will appear in the more detailed description set forth below, it being understood, however, that this more detailed description is given by way of illustration and explanation only, and not by way of limitation, since various changes therein may be made by those skilled in the art without departing from the scope and spirit of the present invention.

It has been found that the tinctorial value of pigments may be tremendously enhanced by the inclusion of a small amount of a hydrated slaked lime or a lime putty, preferably containing magnesia, in asphalt or similar bituminous emulsions.

Even with small amounts of lime putty, for example from 5 to 10%, there is an enhancement of the tinctorial value of the pigment.

For example, 1 volume of a steam refined residual asphalt emulsion with bentonite as an emulsifying agent, may be mixed with from 1 to 5 volumes of a suitable filler material, such as a sharp or river sand.

The color of the mixture will usually be jet black and to this combination is added a relatively small amount, say from 0.1 to 1 volume of a hydrated slaked lime which preferably has been made from dolomite and contains substantial quantities of magnesia. The lime should be thoroughly slaked and to obtain it 50 parts of the lime may be combined with from 50 to 55 parts by weight of water over a period of two days to two weeks.

This type of lime is much more satisfactory than a straight calcium hydroxide lime, since although the latter gives a faster reaction, it does not produce as strong a composition as a dolomitic lime.

The combination of hydrated dolomitic lime, river sand and emulsified residual asphalt is then thoroughly mixed in a dough mixer for about 20 minutes and then the desired color may be added. For example, to obtain a red, 2½% of Spanish iron oxide may be included based upon the total weight of the mixture.

To obtain a green, 2½% of chrome green may be included. To obtain a grey, 2½% of a suitable grade of titanium oxide may be employed. A mixture, for example, of 1½% of iron oxide and 1% of carbon black will give a suitable brown.

Without the inclusion of the slaked hydrated lime, the tinctorial value of the black of the asphalt would overcome the red, green, grey or brown shades of the pigments and would produce a composition having an undesirable muddy or dirty appearance. But with the lime a high development of the color value of the pigment results.

Moreover, the final composition prepared above, for example, is much more satisfactory than a composition such as might be prepared, for example, from 3 volumes of sharp sand, 1 volume of albino asphalt, ½ volume of Portland cement and 4 to 6% of color based upon the total quantity of the material.

In the latter albino asphalt composition, the color of the pigment is less brilliant for the same proportion of pigment, but furthermore, the final composition used in the albino asphalt is much less strong than the emulsified residual asphalt combined with the slaked hydrated dolomitic lime.

Furthermore, the cost of the residual asphalt slaked hydrated dolomitic lime composition is very much less than the cost of the albino asphalt composition.

To give a typical example of a composition which may be used for a mastic flooring, 208 pounds of an emulsified residual asphalt may be combined with 112 pounds of a slaked hydrated dolomitic lime and 1700 pounds of a river bank sand, to which composition may be added 50 pounds of one of the above mentioned pigments per ton of the composition.

The character and amount of filler to be used, whether it be sand, Portland cement, steel wool, wood flour, wood, asbestos or textile fibers, whiting, etc., may vary widely, depending upon the consistency of the product which is desired and the use to which the product is to be put.

The final composition is particularly satisfactory in that the asphalt seems to have undergone a chemical change which not only eliminates or decreases the tinctorial value of the black, but also enables the asphalt together with the lime present to enhance and increase the tinctorial value of the metal oxide which may be added in relatively small amounts. The color appears to have taken part in some chemical combination in the final product, whether it be used as a coating composition or for paving or roofing, and such color appears to be stabilized against fading and washing out.

In addition to being used for coatings or paints and for paving, roofings and floorings, the composition may be used for making precast products such as tile or shingles, may be mixed with fibers to form boards and with latex or rubber compositions for making mats or other similar rubber-like materials. Where water-proofing is desired, small amounts of waxes or insoluble stearates may be employed.

It has been found that the order of mixing also has an important effect upon the final composition, and that a much better product is obtained when the sand and asphalt are first combined together and then combined with the lime putty, with the color or pigment being added last. Where the color is mixed in with the sand and asphalt before combination of such sand and asphalt with the lime, the tinctorial value of the added pigment is not most satisfactorily developed.

The present invention has a broad application to asphaltic cements and the inclusion of the lime and pigment appears to enhance the ductility of the asphalt material.

The present invention avoids any decrease in adhesive characteristics of the emulsion in self bonding properties and in water-proofing ability.

Moreover, the final asphalt binders or cements produced according to the present invention are largely devoid of bleeding, staining and tendency toward brittleness.

Many other changes could be effected in the particular features of colored emulsified asphalt compositions disclosed, and in specific details thereof, without substantially departing from the invention intended to be defined in the claims, the specific description herein merely serving to illustrate certain elements by which, in one embodiment, the spirit of the invention may be effectuated.

What is claimed is:

A colored mastic flooring composition comprising about 208 parts by weight of an emulsified residual asphalt, about 112 parts by weight of a slaked hydrated dolomitic lime, about 1700 parts by weight of river bank sand and about 50 parts by weight of a pigment per ton of the composition.

LEON RALPH FADDEN.